United States Patent
Steinebach

(10) Patent No.: US 7,440,149 B2
(45) Date of Patent: Oct. 21, 2008

(54) ARRANGEMENT AND METHOD FOR CORRECTING DIFFERENT TRANSFER CHARACTERISTIC CURVES FOR SEGMENTED IMAGE SENSORS (CCDS)

(75) Inventor: Wolfgang Steinebach, Salz (DE)

(73) Assignee: Thomson Licensing, Boulogne-Billancourt (FR)

( * ) Notice: Subject to any disclaimer, the term of this patent is extended or adjusted under 35 U.S.C. 154(b) by 950 days.

(21) Appl. No.: 10/353,136

(22) Filed: Jan. 28, 2003

(65) Prior Publication Data

US 2003/0147111 A1  Aug. 7, 2003

(30) Foreign Application Priority Data

Feb. 1, 2002  (DE) .................. 102 04 316

(51) Int. Cl.
*H04N 1/04*  (2006.01)
(52) U.S. Cl. ............ 358/474; 358/486; 358/513; 358/514; 382/132; 382/264
(58) Field of Classification Search .......... 358/474, 358/486, 513, 514, 509, 475, 516, 520, 450, 358/1.9, 3.04; 382/132, 284, 584; 348/584
See application file for complete search history.

(56) References Cited

U.S. PATENT DOCUMENTS

| | | | | |
|---|---|---|---|---|
| 4,205,337 A | * | 5/1980 | Millward | 348/104 |
| 4,656,517 A | * | 4/1987 | Shida et al. | 358/471 |
| 4,691,114 A | * | 9/1987 | Hasegawa et al. | 358/474 |
| 4,734,762 A | * | 3/1988 | Aoki et al. | 358/516 |
| 4,734,787 A | * | 3/1988 | Hayashi | 358/409 |
| 4,742,240 A | * | 5/1988 | Yamanishi et al. | 358/300 |
| 4,774,592 A | * | 9/1988 | Suzuki et al. | 358/451 |
| 5,117,295 A | * | 5/1992 | Smitt | 358/474 |
| 5,122,871 A | * | 6/1992 | Israeli et al. | 358/515 |

(Continued)

FOREIGN PATENT DOCUMENTS

DE   3432185 A1   3/1985

(Continued)

OTHER PUBLICATIONS

Patent Abstract of Japan Pub. No. 11103372A Apr. 13, 1999 JP 09263520.

(Continued)

*Primary Examiner*—Edward L Coles
*Assistant Examiner*—Negussie Worku
(74) *Attorney, Agent, or Firm*—Joseph J. Laks; Robert B. Levy; Jorge Tony Villabon

(57) ABSTRACT

The invention provides an arrangement and a method for generating electrical image signals from an image original. The arrangement is, for example, a film scanner which illuminates or transilluminates a photographic image on a film using an illumination device. Optical signals generated hereby are converted into electrical signals by a CCD sensor subdivided into segments. The segments of the CCD sensor are connected via mutually independent readout channels to a signal processing stage, where the electrical signals of the readout channels are combined with one another in such a way that these represent a total image. Furthermore, an adjustment unit is provided which adjusts the transfer functions of the different segments of the sensor with respect to one another in such a way that visible image disturbances are avoided.

10 Claims, 4 Drawing Sheets

U.S. PATENT DOCUMENTS

| | | | | |
|---|---|---|---|---|
| 5,276,508 A | * | 1/1994 | Boisvert et al. | 348/223.1 |
| 5,363,213 A | * | 11/1994 | Coward et al. | 382/299 |
| 5,465,307 A | * | 11/1995 | Azumaya et al. | 382/165 |
| 5,767,991 A | * | 6/1998 | Hara | 358/518 |
| 5,859,712 A | * | 1/1999 | Kim | 358/504 |
| 5,881,163 A | * | 3/1999 | Slump et al. | 382/132 |
| 6,741,373 B1 | * | 5/2004 | Chizawa | 358/475 |
| 7,224,497 B2 | * | 5/2007 | Nakamura et al. | 358/474 |
| 2002/0051228 A1 | * | 5/2002 | Spears et al. | 358/445 |
| 2003/0076554 A1 | * | 4/2003 | Ide | 358/514 |

FOREIGN PATENT DOCUMENTS

EP    1009159 A2    12/1999

OTHER PUBLICATIONS

Patent Abstract of Japan Pub. No. 072549366A Oct. 3, 1999 JP 07026406.

European Search Report dated Sep. 23, 2002.

* cited by examiner

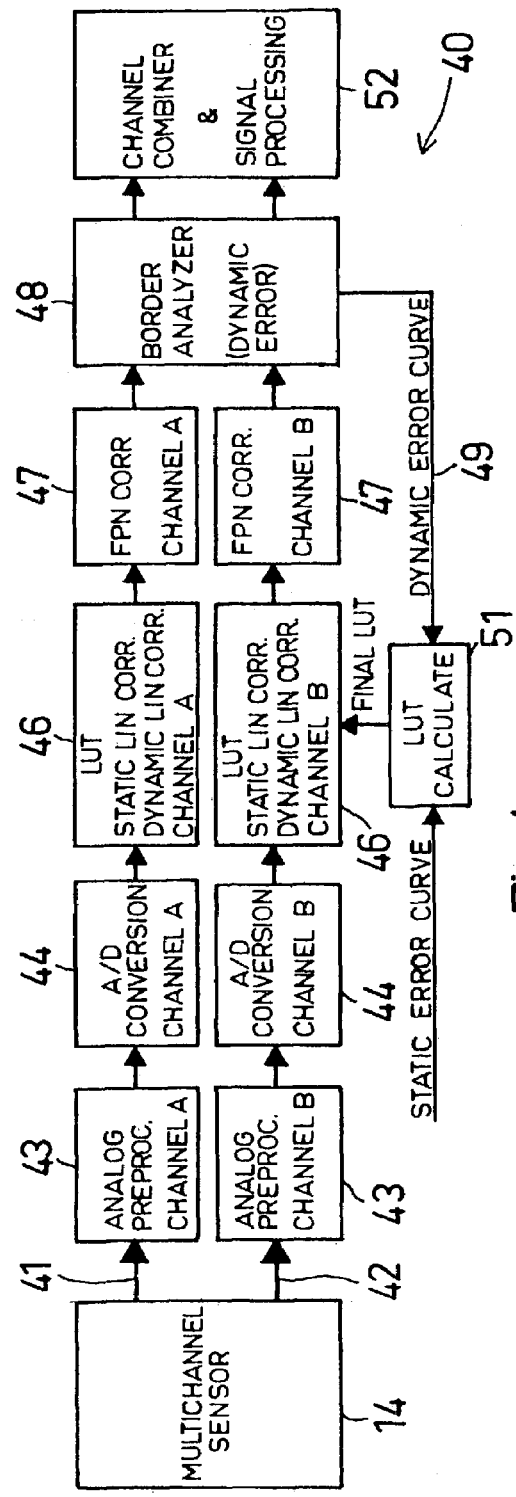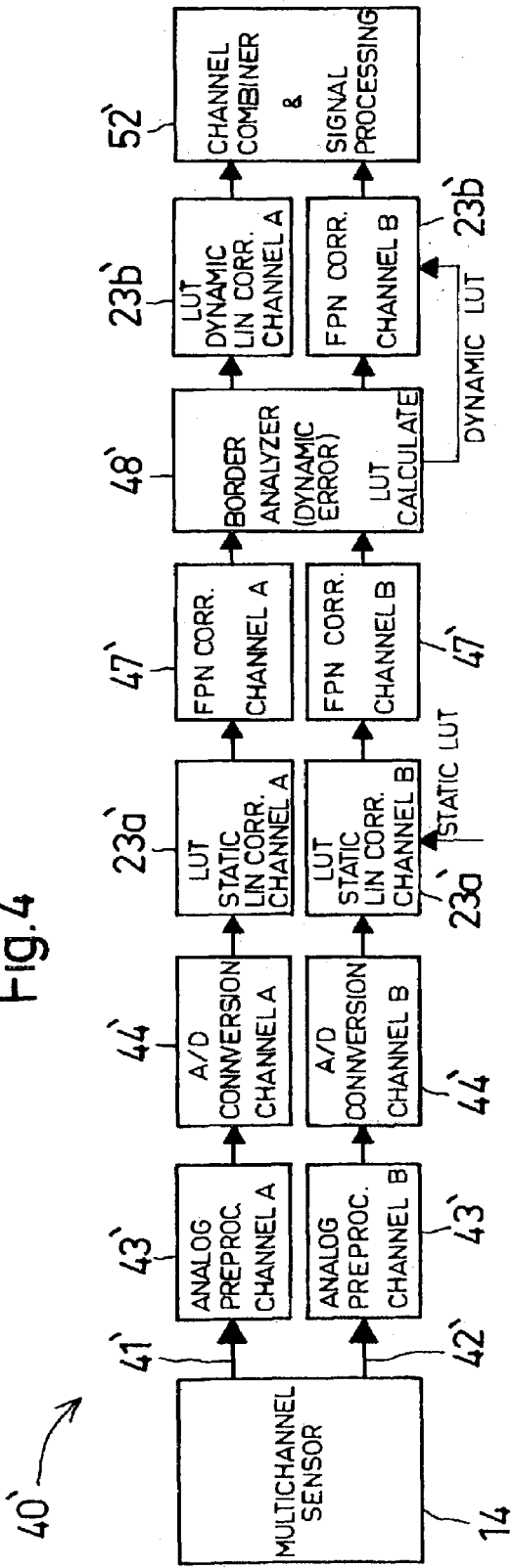

ARRANGEMENT AND METHOD FOR CORRECTING DIFFERENT TRANSFER CHARACTERISTIC CURVES FOR SEGMENTED IMAGE SENSORS (CCDS)

FIELD OF THE INVENTION

The invention relates to the field of image scanning, in particular to a method and an arrangement for generating electrical image signals from an image original. The invention can be applied in particular to a film scanner with segmented image sensors. Said image sensor can be embodied as an areal array sensor or linear array sensor.

BACKGROUND OF THE INVENTION

Film scanners are used to generate video signals or data from photographic film originals. Three basic methods are known in this case: one method uses an areal array sensor (electronic camera) onto which the image is projected and converted into electrical signals. A further method uses a so-called "flying spot" scanner, in which an electron beam is used to write a raster onto the surface of a cathode ray tube. The said raster is imaged onto the film to be scanned and is converted into electrical signals by means of photomultiplier tubes or semiconductors, such as e.g. photodiodes.

A third method uses CCD linear array sensors which supply a serial pixel data stream at the output. In this case, the film to be scanned moves continuously between an illumination device and the CCD sensors, the film image being focussed onto the CCDs by means of an imaging optical arrangement. Three CCDs are often used for the colour separations red, green and blue, the spectral splitting of the colour separations being performed by means of a dichroic light splitter (U.S. Pat. No. 4,205,337).

There are limits, however, with regard to the achievable speed at which such CCD sensors can be read out with high signal quality. The said limits depend e.g. on the semiconductor technology used and on the available clock drivers for the charge shifting circuit. A high readout speed is required, however, if the resolution and thus the number of pixels are increased without slowing down the scan rate (scanning speed in images per second).

In order to simultaneously satisfy the requirements of a high resolution and of fast scanning (e.g. 30 images per second), the sensors are embodied with a plurality of shift register channels and output stages (channel multiplex). One known film scanner uses e.g. CCDs which have four shift registers and four output stages. The way in which all the pixels are divided between a plurality of channels depends on the CCD architecture. Examples are sensors with four separate image segments or divisions into even-numbered and odd-numbered pixels. The different channels are combined again to form a total image in the downstream signal processing. In a scanner according to this method, the first signal processing stages, usually up to the analogue-to-digital conversion, are therefore embodied in a channel multiplex.

Stringent requirements are made as to the quality of the scanned images in the area of post-processing (film post-processing for e.g. cinema films, advertising). The aim is to convert the high contrast range of a photographic negative film material, ranging over a plurality of focal apertures, into a digital copy as close as possible to the gradation of the film. In this case, the channel multiplex described in the scanner is disadvantageous since even very small differences in the behaviour of the individual channels can lead to visible disturbances in the image. Known methods correct the black value of the individual channels by pixel clamping (correlated double sampling) and line clamping, while the white value is effected by adjustment of the gain of individual channels and a so-called FPN correction (FPN: "Fixed Pattern Noise"). This FPN correction eliminates level errors of individual pixels of the illuminated CCDs by determination of the errors and subsequent correction in a multiplier. Two points of the transfer characteristic curve—black value and white value—are thus corrected with sufficient accuracy. However, deviations from the ideal linear transfer characteristic curve "output voltage as a function of the quantity of light" between these points are not detected, and thus lead to errors. These errors then become particularly visible if the channels are separated on the sensor into different, adjacent image segments.

Taking this as a departure point, it is an object of the present invention to provide an arrangement for generating electrical image signals from an image original in which differences in the transfer functions of different channels are corrected.

SUMMARY OF THE INVENTION

This object is achieved by means of an arrangement in accordance with claim 1. Subclaims relate to advantageous developments of the arrangement according to the invention.

The arrangement of the so-called linearity correction is divided into two functional blocks. A distinction is made between static correction, which is effected once e.g. after the scanner has been switched on, and dynamic correction, which analyses the image content at the borders of two adjacent segments, determines correction values for the transfer characteristic curve and performs corrections in the signal processing by means of a look-up table (LUT). While the static correction determines various transfer characteristic curves at the instant of measurement and derives correction values therefrom, dynamic correction can also compensate for temporal alterations in the linearity behaviour, e.g. temperature drift.

A further object of the invention is to specify a method for correcting differences in the transfer functions in a film scanner.

This object is achieved by means of a method according to claim 5.

BRIEF DESCRIPTION OF THE DRAWINGS

An exemplary embodiment of the invention is illustrated using the drawing, in which:

FIG. 4 shows a block diagram of a dynamic linearity correction with feedback loop, FIG. 5 shows a block diagram for sequential static and dynamic linearity correction.

DETAILED DESCRIPTION OF PREFERRED EMBODIMENTS

Figure 1:
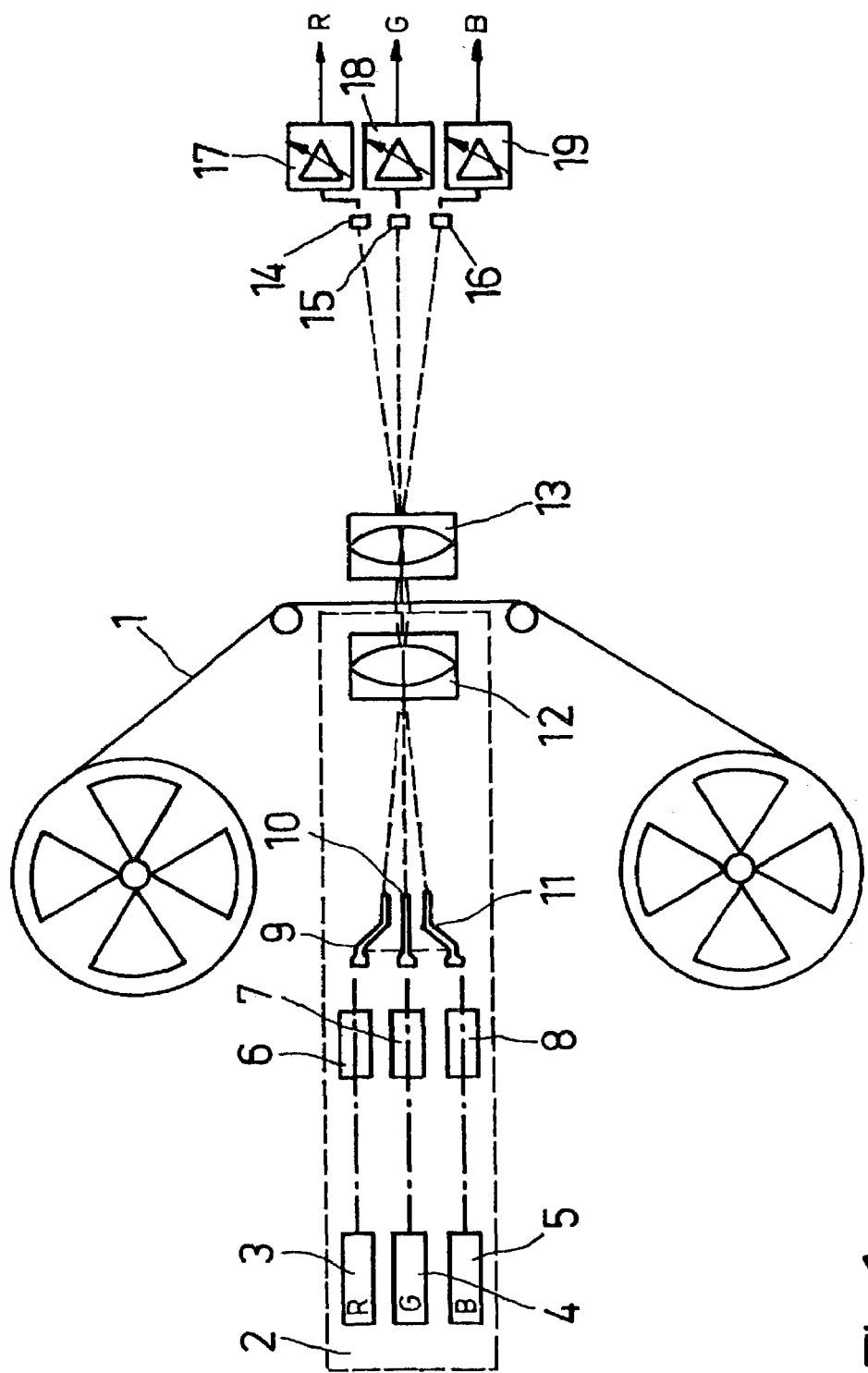
FIG. 1 shows a diagrammatic illustration of a film scanner.

FIG. 1 diagrammatically illustrates a film scanner. In the film scanner, a film 1 is transported through a scanning window by means of a film transport device (not illustrated) and is illuminated by an illumination device 2. In the exemplary embodiment, the illumination device 2 is formed from three illumination sources 3, 4, 5, three attenuation elements 6, 7, 8, three cross-section converters 9, 10, 11 and an optical system 12 on the illumination side. In this exemplary embodiment, laser diodes 3, 4, 5 in the primary colours red, green and blue are provided as illumination sources. First of all, the three laser beams each separately pass through the controllable attenuation elements 6, 7, 8, by means of which the intensity of each laser beam can be set independently of the intensity of the other two laser beams. Control or regulation of the three different light sources in terms of their intensity in the film plane has the advantage, inter alia, that the scanning sensors are illuminated with optimum modulation in each case, independently of the film type respectively used. Consequently, all the scanning sensors operate with the best possible signal-to-noise ratio in each case. In principle, however, it is also possible to use other light sources, for example xenon or halogen lamps equipped with corresponding filters.

The point-shaped light beams of the three laser light sources 3, 4, 5 are widened by means of the cross-section converters 9, 10, 11 to form a respective horizontal gap. This gap is imaged, for illumination purposes, onto the film image situated in the scanning window.

The light points widened by the cross-section converters 9, 10, 11 to form light gaps are preferably imaged on the film by means of the optical system 12 on the illumination side in such a way that the distance between the gaps becomes as small as possible. This makes it possible to ensure that positioning errors of the film 1 are as small as possible while the film 1 is transported between the first and last illumination gaps.

The film image transilluminated line by line is scanned by means of sensors 14, 15, 16—CCD linear array elements were chosen in the exemplary embodiment. Preferably, an optical system 13 on the sensor side, for example a prism splitter, is used to split the image of the film plane further, so that the individual sensors 14, 15, 16 can be arranged at a greater distance from one another. In this way, it is possible to prevent scattered light from one of the other light sources from influencing the respective sensor 14, 15, 16.

Figure 2:
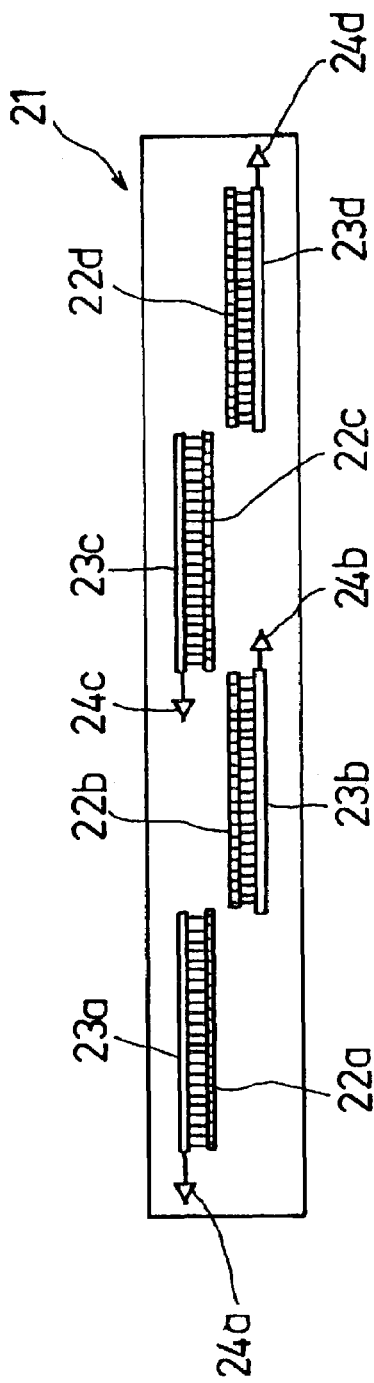
FIG. 2 shows a diagrammatically illustrated linear array sensor from FIG. 1 with four staggered segments.

FIG. 2 diagrammatically illustrates a linear array sensor 21 having four rows $22a \ldots 22d$, which are staggered relative to one another transversely with respect to the longitudinal extent of the rows and are respectively assigned a shift register $23a \ldots 23d$. Each shift register $23a \ldots 23d$ is connected to an output stage $24a \ldots 24d$.

Figure 3:
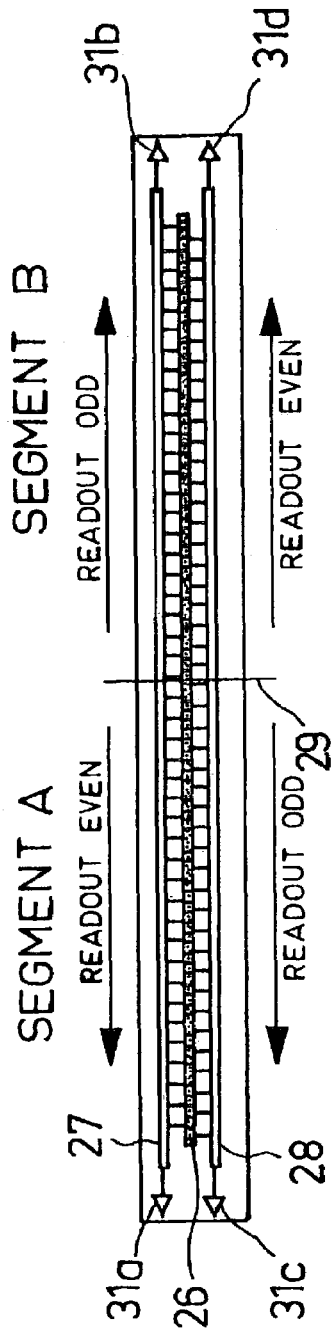
FIG. 3 shows a diagrammatically illustrated linear array sensor from FIG. 1 with left-hand and right-hand segment.

FIG. 3 shows a further CCD linear array sensor 26. The CCD linear array is assigned two shift registers 27, 28. The pixels of the CCD linear array are alternately connected to a respective shift register 27, 28. The sensor 26 is subdivided into two segments A and B, which is indicated by the separating line 29 in FIG. 3. The special feature of the sensor 26 is that even-numbered and odd-numbered pixels are read out from the shift registers 27, 28 in opposite directions. For this purpose, the shift registers 27, 28 are respectively provided with two output stages $31a$, $31b$ and $31c$, $31d$.

FIG. 4 shows a block diagram of a signal processing circuit designated as a whole by the reference symbol 40.

The scanning signals of the sensors 14, 15, 16 are processed in the signal processing circuit 40 for the static and dynamic correction of the linearity in different CCD readout channels. For the sake of clarity, only the signal processing circuit for the sensor 14 is illustrated in FIG. 2, while the identically constructed signal processing circuits for the sensors 15 and 16 are omitted.

The sensor 14 is read out via two readout channels 41, 42, which are first of all separated, but processed further in the same way. Therefore, only the processing of the readout channel 41 is described and mutually corresponding elements are therefore designated by the same reference symbol.

Since the film gaps are imaged at different locations on the film image in the exemplary embodiment illustrated, the scanning signals of each readout channel are delayed in an analogue processing stage 43, in order to compensate for propagation time differences between the various sensors 14, 15, 16. Analogue/digital conversion then takes place in an A/D-converter 44. The static and dynamic linearity is corrected in a function block 46, after which the FPN correction mentioned in the introduction is effected.

The segment borders of the sensor 14 are evaluated in an evaluation stage 48. The evaluation result is fed back to the function blocks 46 via a feedback loop 49 and via a computation unit 51. In the computation unit 51, the dynamic error curve determined is combined with a previously determined static error curve. The results are fed from the computation unit 51 to the function blocks 46. Finally, in a signal processing stage 52, the signals of the two readout channels are combined again to form a total image.

FIG. 5 illustrates an alternative signal processing circuit, which is designated as a whole by the reference symbol 40'. In contrast to the circuit 40 illustrated in FIG. 2, in the circuit 40' the static and the dynamic linearity corrections are effected sequentially, as is evident from the block diagram. The static correction is effected first, then the FPN correction and finally the dynamic correction. Ultimately, however, the same result is achieved, namely a total image which is combined from the readout channels 41', 42'.

In both circuits 40, 40', the readout channels can come both from adjacent CCD segments and from channels with even-numbered and odd-numbered pixels, as are often arranged in linear array sensors.

The details of the static linearity correction will now be described below.

After an FPN correction has adapted the gain for each individual pixel in such a way that the white value is corrected in the manner described above, the characteristic curve "digital CCD signal (downstream of the FPN stage) versus light value" is measured. The measurement takes place in a plurality of steps, the intensity of the light not being effected by altering the illuminance, but rather by controlling the exposure time (integration time) of the CCD sensor, since this yields more accurate results. Firstly, the light intensity is set such that the output level of the CCDs corresponds to 100% video signal. In this case, the integration time of the CCDs $T_{int}$ is set to ten times the minimum integration time $T_{int\ min}$:

$$T_{int} = 10 \times T_{int\ min}$$

In the following measurements, the integration time is then gradually shortened and the video levels resulting for each light value are measured. This yields points on the characteristic curve of the video level as a function of the light intensity. In the practical embodiment, the integration time is varied in integer multiples of $T_{int\ min}$ ($10 \times T_{int\ min}$, $9 \times T_{int\ min}$, $\ldots$ $1 \times T_{int\ min}$) so that ten points of the transfer characteristic curve are determined. Since the integration time of a CCD cannot be set with an arbitrary length without quality losses, the measurements are performed in a further block in the low characteristic curve region (1-10% light quantity) after setting the light to a level that is a factor of 10 lower. The characteristic curve of 0.1% to 1% is determined in the same way, as required. The various segments thus determined are then combined to form a total characteristic curve. It is assumed that the ends of each characteristic curve block, e.g. the result of the measurement given a 10% light level in the block 10-100% and the result of the measurement of the second block 1-10% are identical and the points determined lie one above the other. In the subsequent step, the deviation between the measured characteristic curve and an ideally linear characteristic curve is then calculated and stored in a look-up table (LUT). During the later image scanning, the corresponding correction value is then added to each image signal transmitted by the scanner, so that a corrected image signal is available. It should be taken into account that this correction, in the signal path, is effected before the multiplicative FPN correction, since only then the correction value determined in the measurement is encountered at the characteristic curve point.

The details of the dynamic linearity correction are described below.

Figure 6:
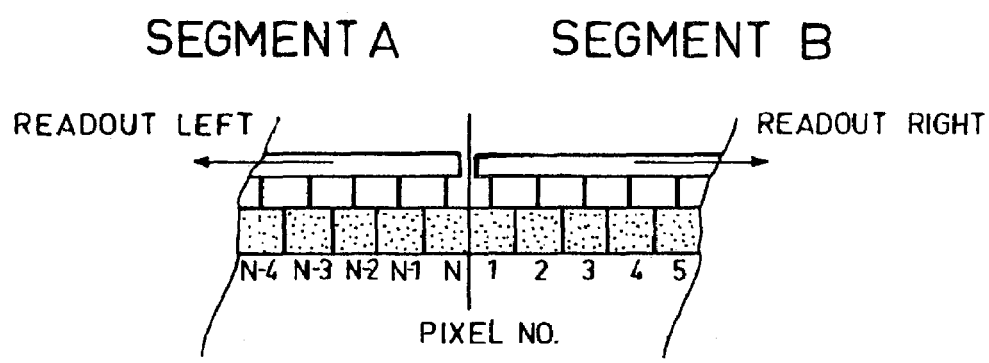
FIG. 6 shows a detail from FIG. 3.

The above-described correction already yields a well-corrected image signal, but dynamic influences, e.g. temperature dependencies in the analogue signal processing or drift effects of the image sensor, are not detected. Therefore, in order to improve the time-variable component of the linearity, continuous detection of the characteristic curve difference at the segment borders of the CCD sensor is provided. In this case, the adjacent pixel values at a segment border are fed to a statistical evaluation unit, which calculates the mean difference in the video levels as a function of the video level. The following example shows the calculation of such an error at a segment border between the segments A and B. The assignment of the indices for this can be seen from FIG. 6. FIG. 6 more particularly illustrates a detail of the CCD sensor 26 from FIG. 3.

Let $CV_{A, n-1}(t)$ be: code value pixel n−1, segment A (penultimate pixel) as a function of time t.

$CV_{A, n}(t)$ be: code value pixel n, segment A (last pixel) as a function of time t.

$CV_{B, 1}(t)$ be: code value pixel 1, segment B (first pixel) as a function of time t.

$CV_{B, 2}(t)$ be: code value pixel 2, segment B (second pixel) as a function of time t.

V1 be: weighting of the directly adjacent pixels $CV_{A, n}(t)$, $CV_{B, 1}(t)$

V2 be: weighting of the second adjacent pixels $CV_{A, n-1}(t)$, $CV_{B, 2}(t)$.

A plurality of pixels at the segment border with variable weighting of the levels can be used for the calculation. This example weights the levels of the directly adjacent pixels [$CV_{A, n}(t)$, $CV_{B, 1}(t)$] with 1, and the adjoining pixels [$CV_{A, n-1}(t)$, $CV_{B, 2}(t)$] with 0.2:V1=1, V2=0.2. In order to eliminate the present image content at the segment border, it is necessary to carry out an averaging over a sufficiently large set M of measurements for different video levels CV.

It is an aim of the correction to minimise the following differential function:

$$\text{Delta}(CV_A) = \frac{1}{M} \sum_{0}^{M} [V1 * CV_{A,n}(t) + V2 * CV_{A,N-1}(t)] - [V1 * CV_{B,1}(t) + V2 * CV_{B,2}(t)]$$

The resulting error curve Delta(CV) as a function of the video level can then be used to perform a correction for segment B in a look-up table (LUT). This table can either be arranged in a downstream processing unit or be embodied in a preceding stage as a control loop. Since the error curve has a homogeneous profile according to experience, measured values are not determined for every binary video value according to the said equation, rather it suffices to determine correction values for specific video value segments and then to calculate an error curve. It is possible e.g. to combine the deviations of the segments for the video ranges 0.1-0.2%, 0.2-0.3% . . . 0.9-1.0%, 1-2%, 2-3% . . . 9-10%, 10-20%, 20-30% . . . 90-100% and to determine a compensation curve.

What is claimed is:

1. A method for optically scanning images, the method comprising the following steps:
    a) optically Illuminating or transilluminating an original image in order to generate optical signals which contain the image information,
    b) imaging the optical signals onto an optical sensor which has a number of pixels which are subdivided in groups into different segments,
    c) converting the optical signals into electrical pixel signals which correspond to the image signals,
    d) reading out the electrical pixel signals from different segments in each case via an independent readout channel, and
    e) correcting values of the electrical pixel signals of pixels adjacent to a segment border by assigning weighting factors to respective adjacent pixels arranged in a direction perpendicular to the segment border depending on the distance to the pixels to be corrected and calculating a value for the pixel to be adjusted based upon the weighted values in order to avoid visible image disturbances caused by differing transfer characteristic curves of respective segments.

2. The method of claim 1, wherein the transfer functions of different transmission channels of the sensor are corrected.

3. The method of claim 1, wherein the correction is performed in such a way that the difference between electrical image signals which originate from pixels lying adjacent to a segment border is minimized.

4. The method of claim 1, wherein a linearity correction of the transfer function of the sensor is performed.

5. The method of claim 1, wherein a correction characteristic is determined by averaging pixel values over time.

6. An arrangement for generating electrical image signals from an image original, the arrangement having an illumination device for optically illuminating or transilluminating an image original and having a light-sensitive element in order to convert optical signals obtained by optically illuminating or transilluminating the image original into electrical signals, the light-sensitive element being subdivided into a plurality of segments which are read out via mutually independent readout channels, and, wherein in a signal processing stage, the electrical signals of the readout channels are combined in such a way that these represent a total image, the arrangement comprising:
    an adjustment unit which adjusts values of the electrical signals of pixels adjacent to a segment border with respect to one another in order to avoid visible image disturbances caused by differing transfer characteristic curves of respective adjacent segments, wherein the adjustment unit is adapted to assign weighting factors to respective adjacent pixels arranged in a direction perpendicular to the segment border depending on the distance to the pixels to be adjusted and to calculate a value for the pixel to be adjusted based upon the weighted values.

7. The arrangement of claim 6, wherein the light-sensitive element is formed by a CCD sensor or a plurality of CCD sensors.

8. The arrangement of claim 7, wherein the CCD sensor is designed as a linear array sensor.

9. The arrangement of claim 8, wherein the linear array sensor has a plurality of rows which are staggered relative to one another transversely with respect to the longitudinal direction of the rows.

10. The arrangement of claim 9, wherein the staggered rows do not overlap in longitudinal direction of the rows.

* * * * *